US009973544B2

(12) United States Patent
Ku et al.

(10) Patent No.: US 9,973,544 B2
(45) Date of Patent: May 15, 2018

(54) METHOD AND APPARATUS FOR ENHANCING INTER-CARRIER COMMUNICATIONS

(71) Applicant: AT&T INTELLECTUAL PROPERTY I, LP, Atlanta, GA (US)

(72) Inventors: Bernard Ku, Austin, TX (US); James W. Forsyth, Royal Oak, MI (US); Lakshminarashimhan Naidu, Pearland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 158 days.

(21) Appl. No.: 14/965,496

(22) Filed: Dec. 10, 2015

(65) Prior Publication Data
US 2017/0171251 A1 Jun. 15, 2017

(51) Int. Cl.
*H04M 7/12* (2006.01)
*H04L 29/06* (2006.01)
(Continued)

(52) U.S. Cl.
CPC ........ *H04L 65/1066* (2013.01); *H04L 61/157* (2013.01); *H04L 61/1511* (2013.01);
(Continued)

(58) Field of Classification Search
CPC .................................................. H04L 65/1013
See application file for complete search history.

(56) References Cited

U.S. PATENT DOCUMENTS 7,672,267 B2  3/2010  Tsai et al.
7,702,092 B2  4/2010  Sheth et al.
(Continued)

FOREIGN PATENT DOCUMENTS

WO    2007107142 A1    9/2007
WO    2009093888 A2    7/2009

OTHER PUBLICATIONS

"Commercial Proposal (Rev.01) for Sansay Session Border Controller for Telefonica," Compshere Telecommunications, Inc., comspheretel.com, Apr. 12, 2013.
(Continued)

*Primary Examiner* — Hoon J Chung
(74) *Attorney, Agent, or Firm* — Guntin & Gust, PLC; Robert Gingher

(57) ABSTRACT

Aspects of the subject disclosure may include, for example, a method including receiving, at a first carrier, a first query for a record of a called number associated with a request to connect an internet protocol call between a first device of the first carrier and a second device of a second carrier, where the first query includes an inter-carrier telephone number mapping apex domain, querying an internetwork packet exchange telephone number mapping equipment of a partner network for a pointer to a second telephone number mapping equipment of the second carrier according to the first query, querying the second telephone number mapping equipment for the record of the called number using the pointer to the second telephone number mapping equipment of the second carrier, and forwarding the record from the second telephone number mapping equipment to an internet protocol multimedia subsystem of the first carrier for routing the internet protocol call to the second carrier. Other embodiments are disclosed.

20 Claims, 10 Drawing Sheets

(51) Int. Cl.
*H04L 29/08* (2006.01)
*H04L 29/12* (2006.01)
(52) U.S. Cl.
CPC .......... *H04L 67/2842* (2013.01); *H04L 67/30* (2013.01); *H04M 7/128* (2013.01)

(56) References Cited

U.S. PATENT DOCUMENTS

| | | | |
|---|---|---|---|
| 7,746,864 | B1 | 6/2010 | Asawa et al. |
| 7,853,996 | B1 | 12/2010 | Ormazabal et al. |
| 7,969,967 | B2 | 6/2011 | Douglas et al. |
| 8,085,757 | B2 | 12/2011 | Ku et al. |
| 8,411,670 | B2 | 4/2013 | Ganesan et al. |
| 8,433,047 | B2 | 4/2013 | Hannan et al. |
| 8,472,431 | B2 | 6/2013 | Siegel et al. |
| 8,571,011 | B2 | 10/2013 | Alt et al. |
| 8,635,324 | B2 | 1/2014 | Tai et al. |
| 8,681,774 | B2 | 3/2014 | Ku et al. |
| 8,705,713 | B2 | 4/2014 | Fan et al. |
| 8,811,393 | B2 | 8/2014 | Reddy et al. |
| 8,861,511 | B2 | 10/2014 | Ku et al. |
| 9,807,246 | B2 * | 10/2017 | Ku .................... H04M 7/0075 |
| 2008/0198997 | A1 * | 8/2008 | Sterman ................ H04L 12/66 379/220.01 |
| 2009/0052434 | A1 | 2/2009 | Jackson et al. |
| 2009/0059895 | A1 | 3/2009 | Yasrebi et al. |
| 2010/0153563 | A1 * | 6/2010 | Ku ..................... H04L 29/1216 709/228 |
| 2011/0271005 | A1 * | 11/2011 | Bharrat ............... H04L 61/1511 709/232 |
| 2012/0300768 | A1 | 11/2012 | Huang et al. |
| 2014/0321331 | A1 | 10/2014 | Dalton et al. |
| 2016/0212177 | A1 * | 7/2016 | Xu ..................... H04L 65/1069 |

OTHER PUBLICATIONS

"ENUM: Mapping Telephone Numbers Onto the Internet," Center for Democracy & Technology, cut.org, Apr. 2003.
"IMS Interconnect: Peering, Roaming and Security—Part One," White Paper, Alcatel-Lucent, webtorials.com, Feb. 2007.
"Interconnecting Networks with Dialogic's Global Multimedia Exchange Platform," White Paper, Dialogic®, dialogic.com, Dec. 2010.
"IP Inter-Carrier Routing: Capabilities to Support IP Services Interconnection," White Paper, iConnectiv, iconectiv.com, May 2014.
"PSTN Transition Focus Group," ATIS, access.atis.org, Jan. 2013. https://access.atis.org/apps/group_public/download.php/20400/PSTN%20Transition.pdf.
"The ISP Column Mar. 2007, Infrastructure ENUM," Internet Society, internetsociety.org, Mar. 2007.
Marsan, Carolyn D. , "ISP offers free Enum registration service to VoIP users," Network World, networkworld.com, May 3, 2004.
Partridge, Brian , "Next-Generation Exchange-Based IP Interconnection", Yankee Group, xconnect.net, Mar. 2011.

* cited by examiner

500

600

METHOD AND APPARATUS FOR ENHANCING INTER-CARRIER COMMUNICATIONS

FIELD OF THE DISCLOSURE

The subject disclosure relates to a method and apparatus for enhancing inter-carrier communications.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
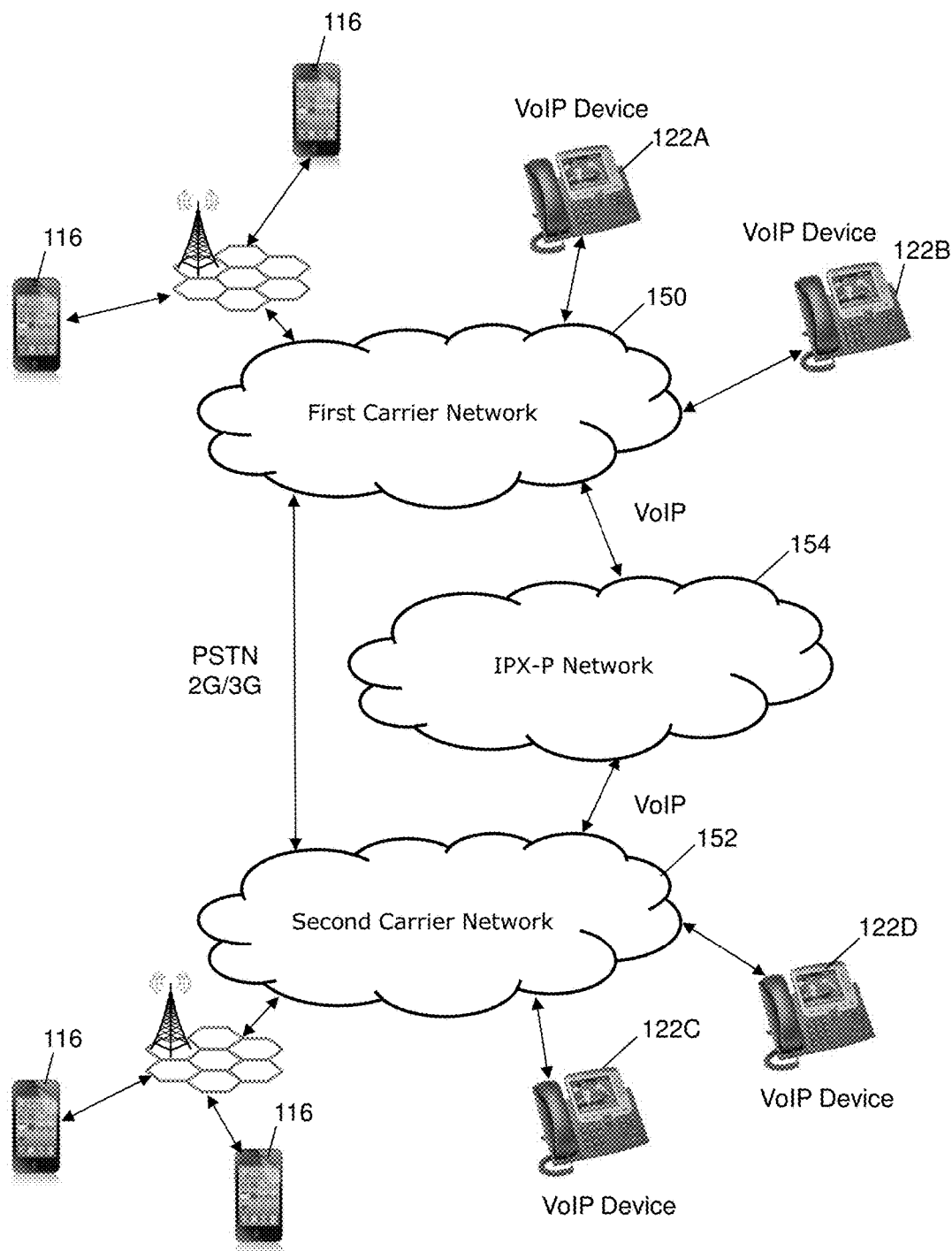
FIG. 1 depicts an illustrative embodiment of a system for enabling IP carrier peering.

The subject disclosure describes, among other things, illustrative embodiments for enabling internet (IP) carrier peering. In particular, systems and methods are described for providing carrier routing for enabling subscribers of a first carrier to locate and connect with subscribers of another IP peering carrier for purposes of conducting IP call sessions, such as voice-over-IP (VoIP). An outbound IP call from a first user device of a first carrier communications network may be destined for a second user device that is associated with a second carrier communications network. As a result of the call request, the first carrier may query a private tElephone Number Mapping (ENUM) of the first carrier using a domain of the first carrier to obtain a record corresponding to the called number of the second user device that is associated with the second carrier. However, the private ENUM of the first carrier may not return a matching record with an IP address for the second device. In such a case, the call request may then be forwarded to a Breakout Gateway Control Function (BGCF) or a Transit Function (TF) that is associated with the first carrier communications network. The BGCF/TF may then modify the ENUM query to use an inter-carrier ENUM apex domain. The modified ENUM query may be sent to an ENUM Cache of the first carrier communication network.

The ENUM Cache may use the modified ENUM query to query an internetwork packet exchange (IPX) Tier 1 ENUM of an IPX partner (IPX-P) network to obtain a pointer to a Tier 2 ENUM that is hosted at the second carrier communications network. The ENUM Cache may query the Tier 2 ENUM of the second carrier based on the pointer. The Tier 2 ENUM of the second carrier may find an entry corresponding to the called number associated with the second user device of the second carrier. The Tier 2 ENUM of the second carrier may return a name authority pointer (NAPTR) record associated with entry, processing of the outbound IP call from the first carrier to the second carrier based on the NAPTR record and gateway URI. The second carrier may then complete the outbound IP call to the desired second user device of the second carrier. Notably, the systems and methods do not require the need for intervention of the first carrier's private ENUM to forward the call request so that overall call flow can be optimized. This may result in dramatically improved and timely call termination. Furthermore, the systems and methods may enable carriers to peer with other carriers to expand their service area coverage so as to provide rich IP services. Other embodiments are described in the subject disclosure.

One or more aspects of the subject disclosure include a communication device including a memory to store executable instructions and a processor communicatively coupled to the memory. The processor, responsive to executing the executable instruction, can perform operations for receiving, from an internet protocol multimedia subsystem of a first carrier, a first query for a record of a called number, where the record for the called number is not available at a first telephone number mapping equipment of the first carrier. The first query can be associated with a request from a first device of the first carrier to initiate an internet protocol call to a second device of a second carrier. The first query can include an inter-carrier telephone number mapping apex domain and the called number corresponding to the second device. The processor can also perform operations for querying, using the first query, an internetwork packet exchange telephone number mapping equipment of a partner network of the first carrier and the second carrier for a pointer to a second telephone number mapping equipment of the second carrier. The processor can further perform operations for querying, using the pointer to the second telephone number mapping equipment of the second carrier, the second telephone number mapping equipment of the second carrier for the record of the called number. The processor can perform operations for receiving the record of the called number from the second telephone number mapping equipment of the second carrier and, in turn, returning the record to the internet protocol multimedia subsystem for routing the internet protocol call to the second carrier.

One or more aspects of the subject disclosure include a machine-readable storage medium, including executable instructions that, when executed by a processor, facilitate performance of operations, including receiving, from a first device of a first carrier, a request to initiate an internet protocol call with a second device. The processor can also perform operations for querying a cache telephone number mapping equipment of the first carrier for a record including a called number corresponding to the second device. The cache telephone number mapping equipment of the first carrier can query an internetwork packet exchange telephone number mapping equipment of a partner network of the first carrier and a second carrier for a pointer to a second telephone number mapping equipment of the second carrier. The cache telephone number mapping equipment of the first carrier can query the second telephone number mapping equipment of the second carrier, using the pointer to the second telephone number mapping equipment of the second carrier, for the record of the called number. The processor can perform operations for receiving the record of the called number from the cache telephone number mapping equipment of the first carrier and, in turn, routing, based on the record, the internet protocol call to the second carrier.

One or more aspects of the subject disclosure include a method including receiving, by a system comprising a processor at a first carrier, a first query for a record for a called number associated with a request to initiate an internet protocol call between a first device of the first carrier and a second device of a second carrier, where the first query comprises an inter-carrier telephone number mapping apex domain. The method can also include querying, by the system, an internetwork packet exchange telephone number mapping equipment of a partner network of the first carrier and the second carrier for a pointer to a second telephone number mapping equipment of the second carrier according to the first query. The method can further include querying, by the system, the second telephone number mapping equipment of the second carrier for the record of the called number using the pointer to the second telephone number mapping equipment of the second carrier. The method can include forwarding, by the system, the record from the second telephone number mapping equipment of the second carrier to an internet protocol multimedia subsystem of the first carrier for routing the internet protocol call to the second carrier.

FIG. 1 depicts an illustrative embodiment of a system for enabling IP carrier peering. A system 100 and accompanying methods provides an architecture for enabling IP carrier peering. In particular, the system 100 may provide for carrier ENUM-based routing for subscriber devices 122A and 122B of a first carrier network 150 to locate and connect with subscriber devices 122C and 122C of another IP peering carrier 152 for full IP capable calling, such as VoIP. VoIP capable devices 122A-D, which can be wired devices 122A-D or wireless devices 116. If a first VoIP device 122A of the first carrier network 150 attempts to call a second VoIP device 122B of the same first carrier network 150, then the private ENUM of the first carrier network 150 can translate the telephone number of the second VoIP device 122B into an Internet address. This is because the private ENUM of the first carrier network 150 can easily access the Internet addresses for all of the first carrier devices. However, if the first VoIP device 122A of the first carrier network 150 attempts to call a third VoIP device 122C of the second carrier network 152, then the private ENUM will likely not be able to convert the telephone number of the third VoIP device 12C into its Internet address because the private ENUM of the first carrier network 150 does not have access to the Internet address for the second carrier devices. If the first carrier network 150 cannot determine the IP address of the VoIP device 122C that is the target of the IP call session, then first carrier network 150 will be forced to complete the call using a non-IP connection, such as a public switched telephone network (PSTN) or a cellular 2G or 3G connection. Will this form of call completion will enable voice communications, the advantages (e.g., data rate, cost of calling session, rich IP data) of an all-IP connection can be lost.

Figure 2:
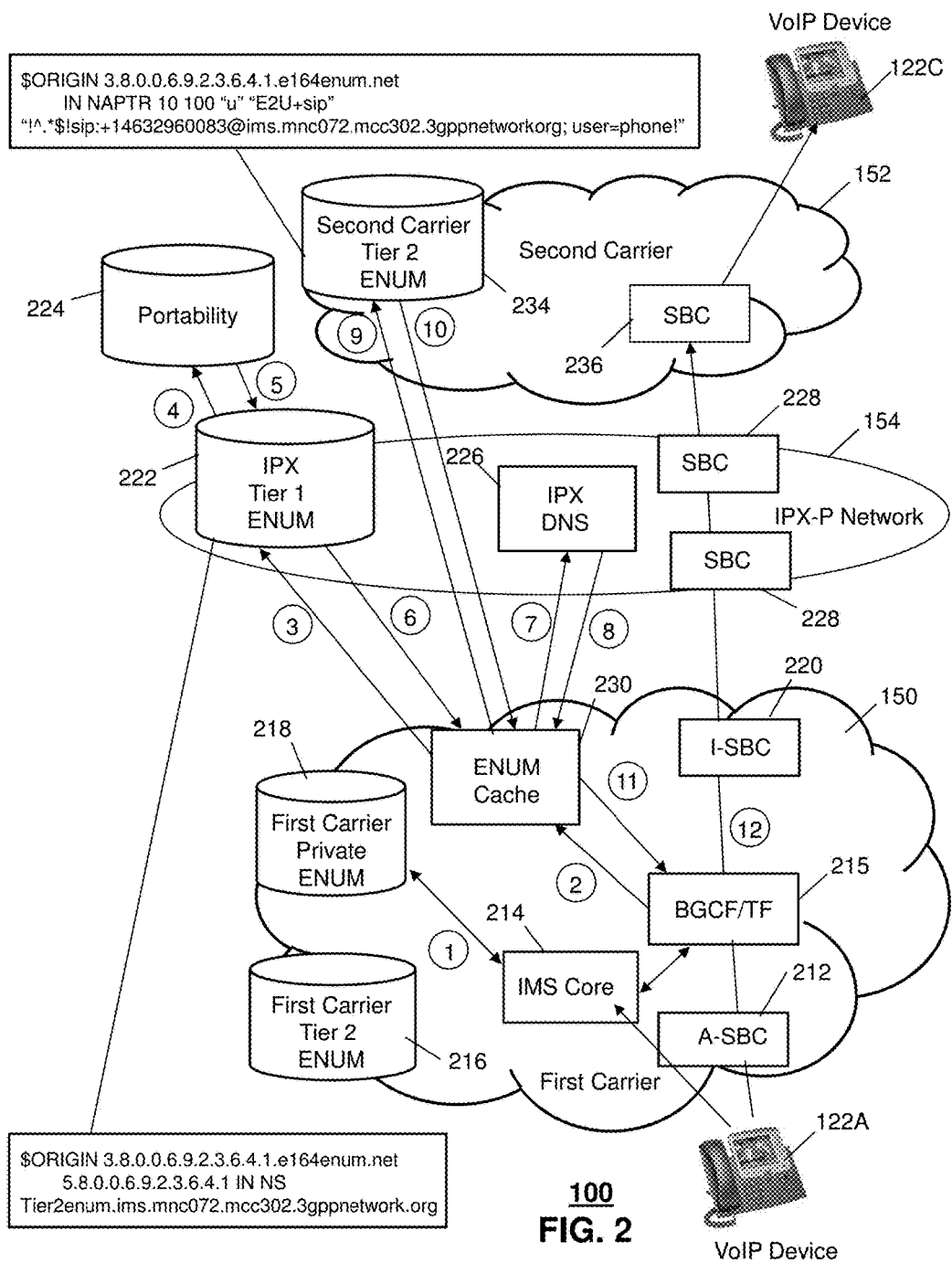
FIG. 2 depicts an illustrative embodiment of a schematic diagram of the system for enabling IP carrier peering as shown in FIG. 1.

FIG. 2 depicts an illustrative embodiment of a schematic diagram of the system for enabling IP carrier peering as shown in FIG. 1. In one or more embodiments, system 100 may be configured to support content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, productivity applications and services, mobile applications and services, and any other computing applications and services. The system 100 may include a first device 122A that may be utilized to access data, content, and services, or to perform a variety of other tasks and functions for a subscriber of the first carrier network 150. As an example, the first device 122A may be used to make one or more IP-based calls (or other types of calls) to devices of other subscribers of the first carrier network 150, to devices 122C of subscribers of a second carrier network 152, or to devices of subscribers of any other carrier. In one or more embodiments, the first device 122A may be a computer, a laptop, a tablet device, a phablet, a server, a mobile device, a smartphone, a smart watch, or any other type of computing device.

In one or more embodiments, the system 100 may also include a second device 122C that may be used by a subscriber to the second carrier 152 to also access data, content, and services, and to perform a variety of other functions. For example, the second device 122C may also be used to transmit signals to request various types of content, services, and data provided by content and service providers associated with the second carrier network 152 or any other network in the system 100. Also, the second device 122C may be used to make one or more IP-based calls (or other types of calls) to devices of other subscribers of the second carrier network 152, devices of subscribers of the first carrier network 150, or devices of subscribers of any other carrier. Similar to the first device 122A, in one or more embodiments, the second device 122C may be a computer, a laptop, a tablet device, a phablet, a server, a mobile device, a smartphone, a smart watch, or any other type of computing device.

In one or more embodiments, the system 100 may also include a first carrier communications network 150 that may be configured to link each of the devices in the system 100 to one another. For example, the first carrier communications network 150 may be utilized by the first device 122C to connect with other devices within or outside first carrier communications network 150. Additionally, the first carrier communications network 150 may be configured to transmit, generate, and receive any information and data traversing the system 100. In one or more embodiments, the first carrier communications network 150 may include any number of servers, databases, or other componentry. The first carrier communications network 150 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. In one or more embodiments, the first carrier communications network 150 may be part of a single autonomous system that is located in a particular geographic region, or be part of multiple autonomous systems that span several geographic regions.

The first carrier communications network 150 may include a series of components to facilitate communications and the functions of the first carrier communications network 150. In particular, the first carrier communications network 150 may include an access session border controller (A-SBC) 212, which may reside at a border of the first carrier communications network 150 and may be used by the first device 122A to access the IMS Core 214 of the first carrier communications network 150, such as when making an IP-based call. The IMS Core 214 of the first carrier communications network 150 may perform any functions of a traditional IMS Core. The first carrier communications network 150 may also include a first carrier private ENUM 218 that may conform to an E.164 ENUM standard. The private ENUM 218 may also include any of the functions and features of a traditional private ENUM and may be private to the first carrier communications network 150.

In one or more embodiments, the first carrier communications network 150 may further include a first carrier Tier 2 ENUM 216 that may include any of the functionality of a traditional Tier 2 ENUM. The first carrier private ENUM 218 and first carrier Tier 2 ENUM 216 may contain DNS records and may utilize the DNS records to translate telephone numbers into a URI or IP address that may be utilized in IP-based communications. The IMS Core 214 can query the Tier 2 ENUM 216 for a NAPTR record for a second device 122C. In one or more embodiments, the first carrier communications network 150 may include an interconnect-SBC (I-SBC) 220 that may reside at a boundary of the first carrier communications network 150, where different networks may interconnect or peer with the first carrier communications network 150. For example, the I-SBC may provide an interconnect routing to an IPX-P network 154 and/or the second carrier communications network 152.

In one or more embodiments, the first carrier communications network 150 can further include an ENUM cache 230 (or cache ENUM). The ENUM cache 230 can include NAPTR records and DNS records and can use NAPTR records and DNS records for translating telephone numbers into URI addresses and/or IP addresses that can be further used to query an IPX Tier 1 ENUM 222, a second carrier Tier 2 ENUM 234, and/or an IPX DNS 226. In one embodiment, if the Tier 2 ENUM 216 does not return the NAPTR record for the second device 122C to the IMS Core 214, then the IMS Core 214 can forward the query to the BGCF/TF 215. The BGCF/TF 215 can then query the ENUM cache 230 of the first carrier network 150 for the NAPTR record for the second device 122C of the second carrier network 152 in order to complete an IP call between the second device 122C and the first device 122A of the first carrier network 150. The ENUM cache 230 can perform a series of actions to procure the NAPTR record for the second device 122C from the IPX-P network 154 and/or the second carrier network 152 and thus relieve the administrative and communication burden of procuring the NAPTR record for a second carrier network device from the BGCF/TF 215. In one embodiment, the ENUM cache 230 can query the IPX Tier 1 ENUM, using the telephone number of the second device coupled with an inter-carrier ENUM apex domain.

The IPX Tier 1 ENUM can return a pointer to the second carrier Tier 2 ENUM 234. If the pointer includes a URI for the second carrier Tier 2 ENUM 234 but not an IP address, then the ENUM cache 230 can resolve the URI into the IP address by querying a DNS server, such as an IPX DNS 226. In one embodiment, once the ENUM cache 230 has the IP address of the second carrier Tier 2 ENUM 234, the ENUM cache 230 can query the second carrier Tier 2 ENUM 234 for the NAPTR record of the second device 122C. The ENUM cache 230 can then return the NAPRT record to the BGCF/TF 215, which can then route the IP call through the I-SBC 220 of the first carrier and SBCs 228 and 236 of the IPX-P network 154 and the second carrier network 152 to connect the first device 122A and the second device 122C and provide a full-IP capability.

In one or more embodiments, the ENUM cache 230 can provide a cache capability to further improve the performance of the system. For example, the ENUM cache 230 of the first carrier network 150 can store the results of recent queries of the IPX Tier 1 ENUM 222, including DNS resolutions of IP addresses, for pointers to Tier 2 ENUMs of peer carriers. Where, as in the above-described example, the ENUM cache 230 has received a pointer to the second carrier Tier 2 ENUM 234, the pointer and/or a resolved IP address can be stored by the ENUM cache for a time period. For example, the pointer could be stored for ten minutes. If a subsequent query for a device that is part of the lookup responsibility of the second carrier Tier 2 ENUM is received at the ENUM cache 230 within the storage period, then the ENUM cache 230 can find the stored record and can immediately query the second carrier Tier 2 ENUM without first querying the IPX Tier 2 ENUM. The stored pointer can be removed after expiration of the storage period or upon a system command to insure that the ENUM cache is not using outdated information.

In one or more embodiments, the system 100 may further include an IPX-P network 154. The IPX-P network 154 of the system 100 may be configured to link each of the devices and/or networks in the system 100 to one another. The IPX-P network 154 may be a partner network of the first carrier communications network 150 and/or a partner network of the second carrier communications network 152. Additionally, the IPX-P network 154 may be configured to transmit, generate, and receive any information and data traversing the system 100. In one or more embodiments, the IPX-P network 154 may include any number of servers, databases, or other componentry. The IPX-P network 154 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network or any combination thereof. In one or more embodiments, the IPX-P network 154 may be part of a single autonomous system that is located in a particular geographic region, or be part of multiple autonomous systems that span several geographic regions.

In one or more embodiments, the IPX-P network 154 may include a series of SBCs 228 that may be utilized to exert control over signaling associated with communications, such as calls, traversing through the IPX-P network 154, and may include any functionality associated with a session border controller. The IPX-P network 154 may further include an IPX Tier 1 ENUM 222. The IPX Tier 1 ENUM 222 may be a higher tiered ENUM as compared to other ENUMs in the system 100. The IPX Tier 1 ENUM 222 may store name server records including information and IP addresses for the Tier 2 ENUMs 216 and 234 of networks that are partnered with the IPX-P network 222. For example, the IPX Tier 1 ENUM 222 may include IP address information and pointers to the Tier 2 ENUM 216 of the first carrier and the Tier 2 ENUM 234 of the second carrier. In one or more embodiments, the IPX Tier 1 ENUM 222 may store name server records and pointers for other types of ENUMs and/or for any type of devices in other partner networks.

In one or more embodiments, the IPX-P network 154 can further include a portability database 224. The portability database 224 can include NAPTR and DNS records for identifying Tier 2 ENUMs for any carriers that are participating in a peer carrier arrangement for IP calls. In one embodiment, the IPX Tier 1 ENUM 222 can query the portability database 224, using a telephone number of the second device 122C coupled with an inter-carrier ENUM apex domain, to determine a service profile identifier (SPID) for a the carrier network of the second device 122C. If the carrier network, in this case the second carrier network 152, is participating, then the portability database will return the SPID for the second carrier network 152. The IPX Tier 1 ENUM 222 can convert the SPID into a pointer for the second carrier network 152 by mapping the SPID to an N2 record and/or an A record. The IPX Tier 1 ENUM 222 can return the mapped pointer to the ENUM cache 230, which can then contact the second carrier Tier 2 ENUM 234.

In one or more embodiments, the IPX-P network 154 can further include an IPX domain name server (IPX DNS) 226. The IPX DNS 226 can include DNS records for use in converting URI addresses into IP addresses. In one embodiment, the ENUM cache 230 can query the IPX DNS 226 of the IPX-P network 154, using a URI address that it has obtained for the second carrier Tier 2 ENUM. The IPX DNS 226 can resolve the URI address to the correct IP address so that the ENUM cache 230 can query the second carrier Tier 2 ENUM 234.

In one or more embodiments, the system 100 may also include a second carrier communications network 152. The second carrier communications network 152 of the system 100 may be configured to link each of the devices in the system 100 to one another. For example, the second carrier communications network 1525 may be utilized by the second user device 122C to connect with other devices within or outside second carrier communications network 152. Additionally, the second carrier communications network 152 may be configured to transmit, generate, and receive any information and data traversing the system 100. In one or more embodiments, the second carrier communications network 152 may include any number of servers, databases, or other componentry. The second carrier communications network 152 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. In o embodiments, the second carrier communications network 152 may be part of a single autonomous system that is located in a particular geographic region, or be part of multiple autonomous systems that span several geographic regions.

In one or more embodiments, the second carrier communications network 152 may include a series of components to facilitate communications and the functions of the second carrier communications network 152. In particular, the second carrier communications network 152 may include SBCs 236, which may include any of the functions of a traditional session border controller. For example, SBC 236 may reside at a border of the second carrier communications network 152 and may exert control over signaling associated with communications, such as calls, traversing through the second carrier communications network 152. The second carrier communications network 152 may also include a Tier 2 ENUM 234 that may include any of the functionality of a traditional Tier 2 ENUM. Tier 2 ENUM 234 may utilize DNS records to translate telephone numbers into a URI or IP address that may be utilized in IP-based communications.

Figure 3:
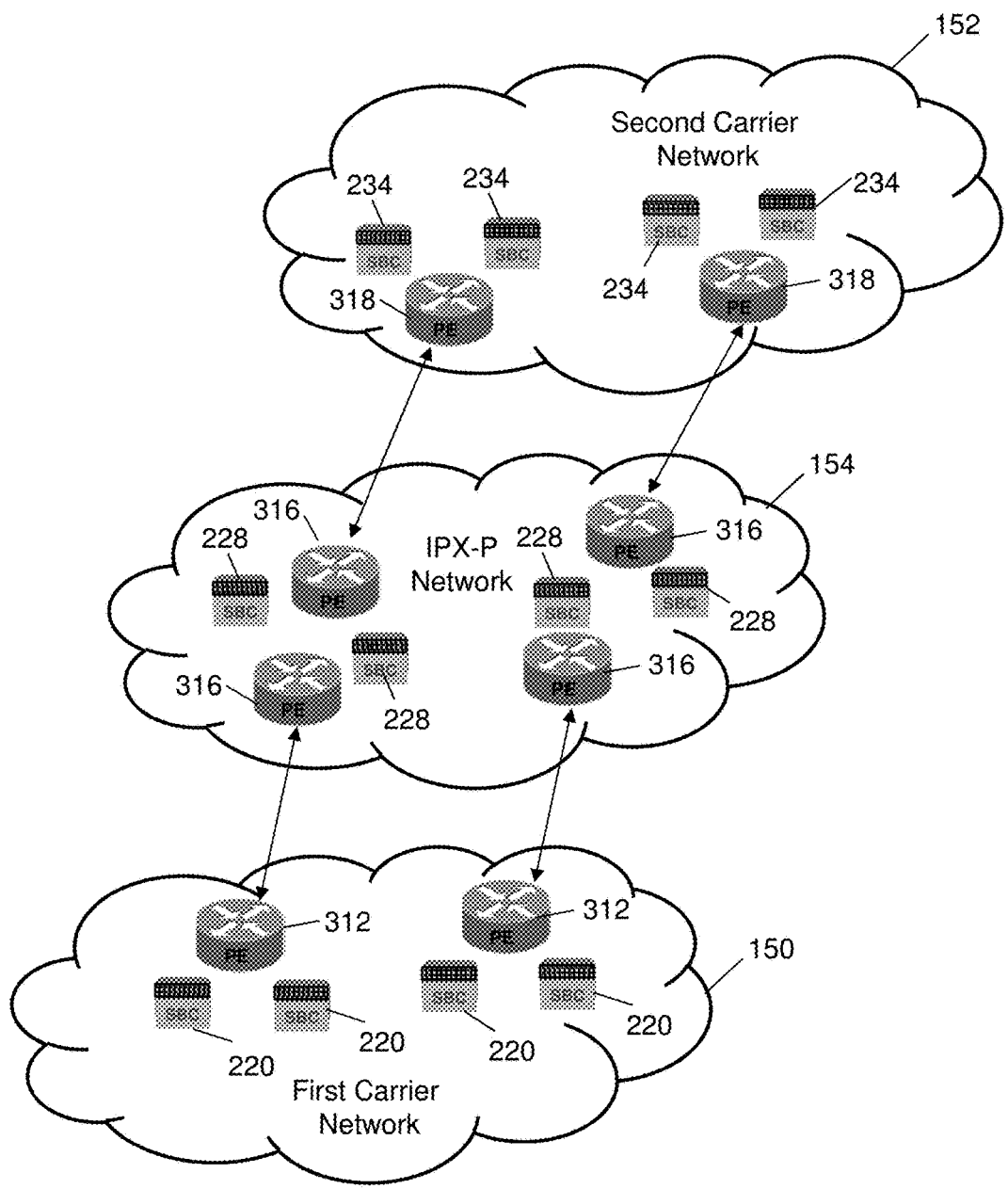
FIG. 3 depicts an illustrative embodiment of a schematic diagram illustrating IPX interconnection between a first carrier network, an IPX-P network, and a second carrier network.

FIG. 3 depicts an illustrative embodiment of a schematic diagram illustrating IPX interconnection between a first carrier network 150, an IPX-P network 154, and a second carrier network 152. The first carrier network 150 can provide edge devices 312 (e.g., routers) that can be used for connecting the first carrier network to the other networks in the system 100. The IPX-P network 154 may include any number of provider edge devices 316 (e.g. routers) that may be used to connect the IPX-P network 154 to the other networks in the system 100. The second carrier network 152 may include any number of provider edge devices 318 (e.g. routers) that may be utilized to connect the second carrier network 152 to the other networks in the system 100.

Figure 4:
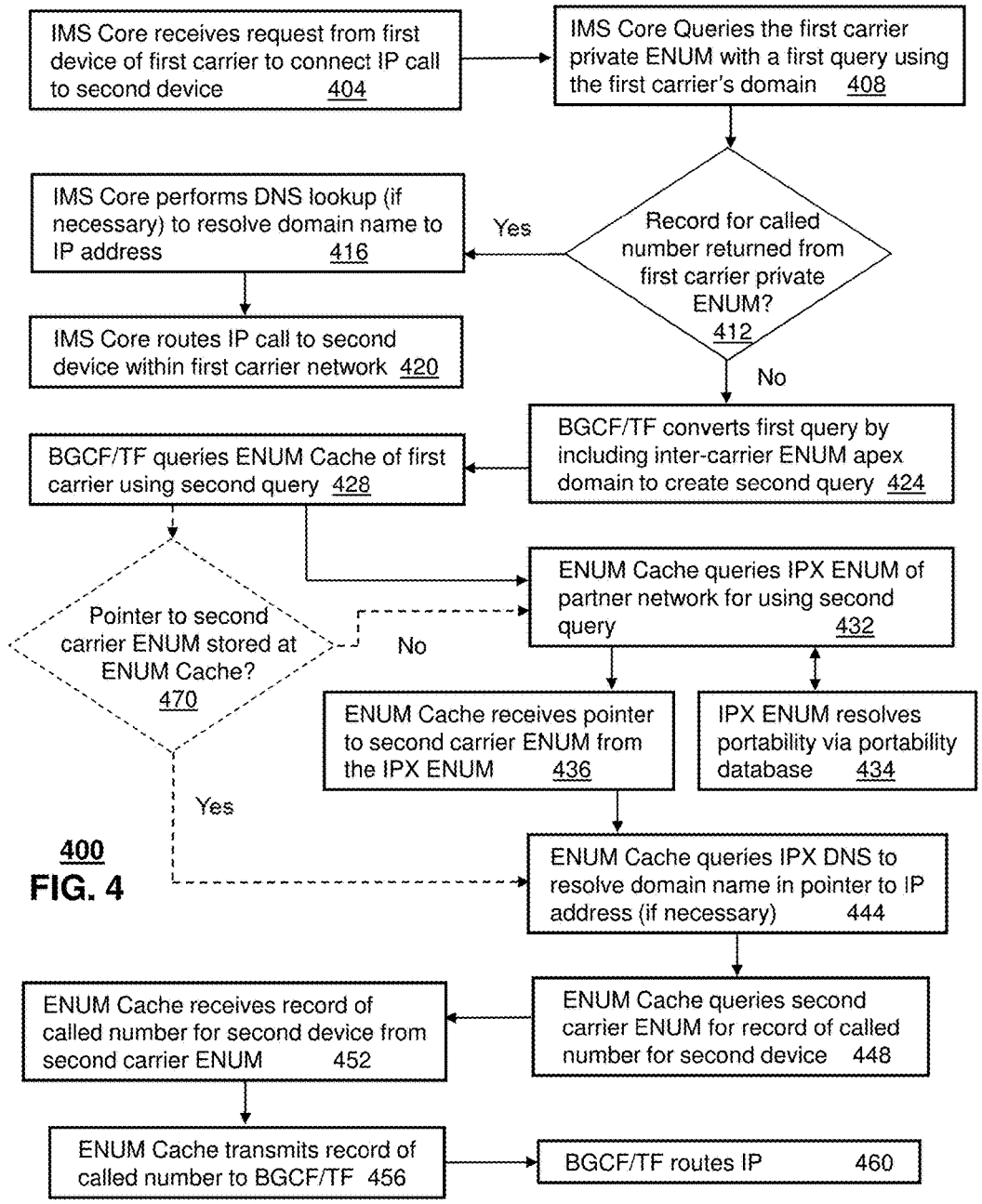
FIG. 4 depicts an illustrative embodiment of a method used in portions of the system described in FIGS. 1-3.

FIG. 4 depicts an illustrative embodiment of a method used in portions of the system described in FIGS. 1-3. While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As shown in FIG. 4, an exemplary method 400 for enabling IP carrier peering is schematically illustrated. The method 400 include steps for processing an IP based call (e.g. a VoLTE call) from a first device 122A of a first carrier network 150 to a second device 122C of a second carrier network in accordance with the disclosure provided herein. The method 400 may include, at step 404, an IMS Core 214 of the first carrier network 150 a receiving, a request to establish an IP-based call. Initially, the first device 122A may initiate a call (e.g. IP-based call) intended for the second device 122C. In response to receiving the call request from the A-SBC 212 of the first carrier network 150, the IMS Core 214 may query the private carrier ENUM 218 of the first carrier using the called number (e.g. E-164 number) of the second device 122C of the second carrier in step 408, as shown in Flow 1 in FIG. 2. The query may include a domain associated with the first carrier, such as "e164.arpa," which may be the domain configured with the ENUM client, which is, in this case, the IMS Core 214. In one or more embodiments, the query of the first carrier private ENUM 218 may include the called number appended as <reverse telephone number>0.1.e164.arpa, which is sent to the first carrier private ENUM 218 as "ORIGIN 1.1.1.1.2.2.2.2.1.5.1.e164.arpa."

In one or more embodiments, the first carrier private ENUM 218 can search for a NAPTR record for the second device 122C at step 412. If the second device 122C was a subscriber device for the first carrier network 150, then the first carrier private ENUM 218 may find and return a NAPTR record for the second device 122C. At step 416, the IMS Core 214 can, if necessary, perform a DNS lookup to resolve a domain name or URL from the NAPTR to an IP address. The IMS Core 214 can use this IP address to route the requested IP call between the first device 122A and the second device 122C within the first carrier communications network 150 at step 420. However, if the second device 122C is not a subscriber device of the first carrier network 150, then the first carrier private ENUM 218 will not have a record associated with the called number, and may return a signal and/or notification to the IMS Core 214 indicating that a "Record was not Found" in "e164.arpa," in step 412.

In one or more embodiments, in response to receiving the signal and/or notification of no record found, in step 412, the IMS Core 214 may forward the request for the IP call to the BGCF/TF 215 (per 3GPP IMS standards). The BGCF/TF 215 can then modify the query to include an inter-carrier ENUM apex domain, such as "e164enum.net," in step 424. The BGCF/TF 215 can send the modified query with the inter-carrier ENUM apex domain to the ENUM cache 230 of the first carrier 150 in step 428, as shown in Flow 2 as shown in FIG. 2.

In one or more embodiments, the ENUM cache 230 can query the IPX Tier 1 ENUM 222 of the IPX-P network in step 432, as shown in Flow 3 of FIG. 2, using the telephone number of the second device coupled with an inter-carrier ENUM apex domain. In the step 434, the IPX Tier 1 ENUM 222 can resolve whether an IP call between the first device 122A of the first carrier network 150 and the second device 122C of the second carrier network 152 is portable by querying the portability database 224, as shown in Flows 4 and 5 of FIG. 2. In one embodiment, the IPX Tier 1 ENUM 222 can query the portability database 224, using the telephone number of the second device 122C coupled with the inter-carrier ENUM apex domain, to determine a service profile identifier (SPID) for a the carrier network of the second device 122C. If the carrier network, in this case the second carrier network 152, is participating, then the portability database will return the SPID for the second carrier network 152. In one embodiment, the IPX Tier 1 ENUM 222 can convert the SPID into a pointer for the second carrier network 152 by mapping the SPID to an N2 record and/or an A record. In one or more embodiments, the IPX Tier 1 ENUM 222 can return a pointer to the second carrier Tier 2 ENUM 234 in step 436, as shown in Flow 6 of FIG. 2.

In one or more embodiments, if the pointer includes a URI for the second carrier Tier 2 ENUM 234 but not an IP address, then the ENUM cache 230 can resolve the URI into the IP address by querying a DNS server, such as an IPX DNS 226, in step 444, as shown in Flows 7 and 8 as shown in FIG. 2. However, if the pointer already includes the IP address, then step 444 (and Flows 7 and 8) can be omitted. In one embodiment, once the ENUM cache 230 has received the IP address of the second carrier Tier 2 ENUM 234, the ENUM cache 230 can query the second carrier Tier 2 ENUM 234 for the NAPTR record of the second device 122C in step 448, as shown in Flow 9 of FIG. 2, and receive the NAPTR record in step 452, as shown in Flow 10 of FIG. 2. The ENUM cache 230 can then return the NAPRT record to the BGCF/TF 215, in step 456, as shown in Flow 11 of FIG. 2. The BGCF/TF 215 can then route the IP call, in step 460, through the I-SBC 220 of the first carrier and the SBCs 228 and 236 of the IPX-P network 154 and the second carrier network 152, respectively, to connect the first device 122A and the second device 122C and provide a full-IP capability, as shown in Flow 12 of FIG. 2.

In one or more embodiments, the ENUM cache 230 can provide a cache capability to further improve the performance of the system. For example, the ENUM cache 230 of the first carrier network 150 can store the results of recent queries of the IPX Tier 1 ENUM 222, including DNS resolutions of IP addresses, for pointers to Tier 2 ENUMs of peer carriers. Where, as in the above-described example, the ENUM cache 230 has received a pointer to the second carrier Tier 2 ENUM 234, the pointer and/or a resolved IP address can be stored by the ENUM cache for a time period. For example, the pointer could be stored for ten minutes. If a subsequent query for a device that is part of the lookup responsibility of the second carrier Tier 2 ENUM is received at the ENUM cache 230 within the storage period, then the ENUM cache 230 can search for the stored record, in step 470, and, if found, can immediately query the second carrier Tier 2 ENUM 234 without first querying the IPX Tier 2 ENUM 222. The stored pointer can be removed after expiration of the storage period or upon a system command to insure that the ENUM cache is not using outdated information.

In one or more embodiments, an example query response (Flow 6) by the IPX Tier 1 ENUM 222 to a query by the ENUM cache 230 (Flow 3), as illustrated in FIG. 2, may include the following records:
$ORIGIN 3.8.0.0.6.9.2.3.6.4.1.e164enum.net,
3.8.0.0.6.9.2.3.6.4.1 IN NS, and
Tier2enum.ims.mnc072.mcc302.3gppnetwork.org.

In the response, the term, "mnc072.mcc302," may be an IMS 3GPP standard for depicting a specific carrier (e.g. the second carrier), which is associated with the device that is the called party of the IP call. In addition, the term, "mnc," may be a mobile network code and the term, "mcc," may be a mobile country code. Notably, there is no need for intervention of the private ENUM 133 to forward to the IPX Tier 1 ENUM 222, so that the overall call flow may be optimized, which may result in timely call termination.

In one or more embodiments, an example query response (Flow 10) of the IPX Tier 1 ENUM 22 to a query by the ENUM cache 230 (Flow 9), as illustrated in FIG. 2, may include the following records:
$ORIGIN 3.8.0.0.6.9.2.3.6.4.1.e164enum.net,
IN NAPTR 10 100 "u" "E2U+sip", and
"!^.*$!sip:+
14632960083@ims.mnc072.mcc302.3gppnetwork.org;
user=phone!".

Figure 5A:
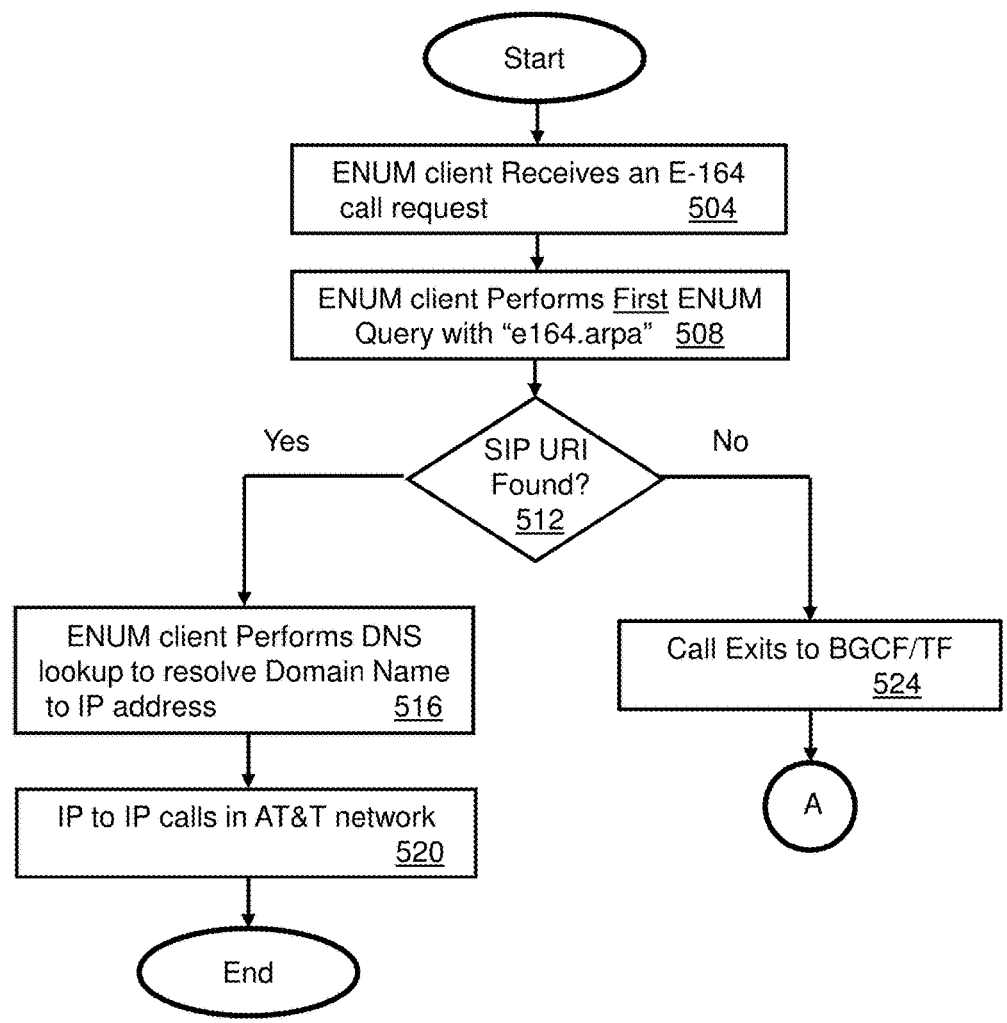
FIGS. 5A-5B depict an illustrative embodiment of a method used in portions of the system described in FIGS. 1-3.
Figure 5B:
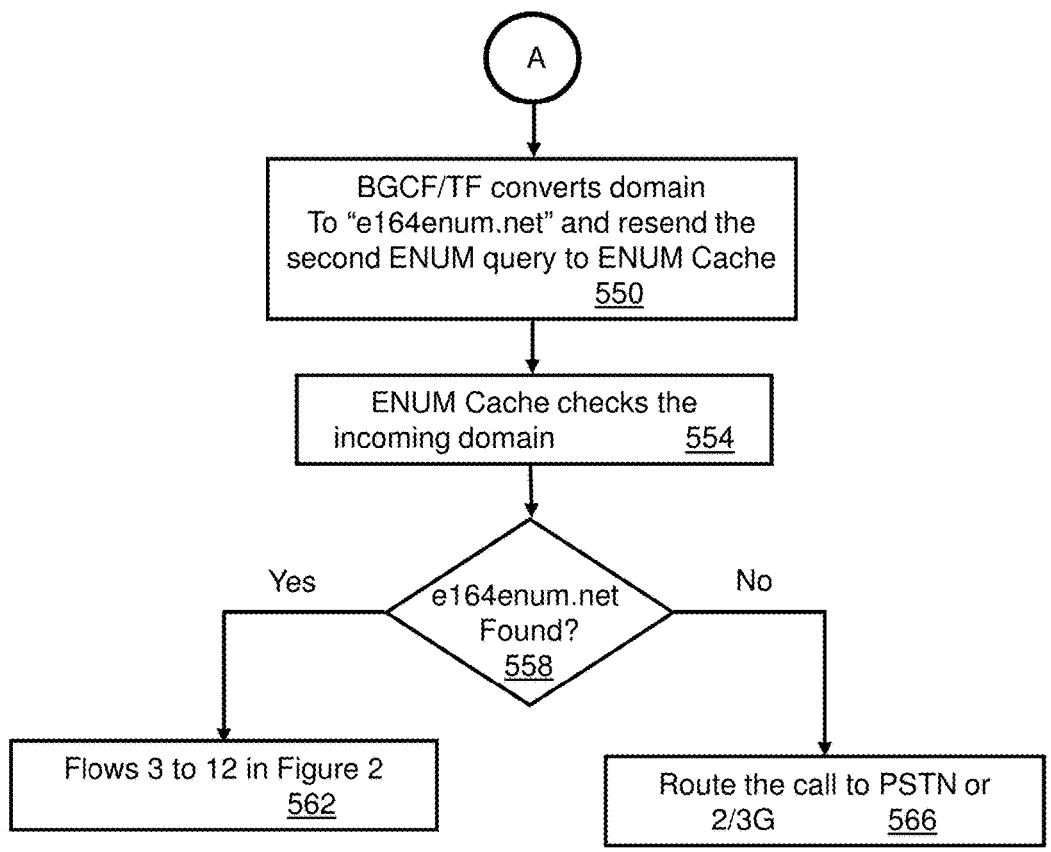

FIGS. 5A-5B depict an illustrative embodiment of a method used in portions of the system described in FIGS. 1-3. As shown in FIG. 5A, an exemplary method 500 for processing an IP-based call using a target architecture for enabling IP carrier peering is schematically illustrated. The method 500 may illustrate a sequence of steps that may be utilized for processing an IP-based call, such as a VoLTE call, from a first device 122A of the first carrier 150 to a second device 122B of the first carrier 150 or to a second device 122C of a second carrier 152. Initially, the method 500 may include, at step 504, receiving, from the first device 122A, an IP call intended for either a second device 122B of the first carrier 150 or the second device 122C of the second carrier 152. The call may be a request to connect the first device 122A to the second device 122B of the first carrier 150 or the second device 122C of the second carrier 152. In one or more embodiments, the call may be received by an ENUM client, such as the first carrier 150, and the call may include an E-164 request.

At step 508, the method 500 may include having the ENUM client perform a first ENUM query using a domain, such as "e164.arpa", associated with the first carrier 150. In one or more embodiments, the first ENUM query may be performed by utilizing the IMS Core 214, the private ENUM 218 of the first carrier 150, and/or the first carrier communications network 150. At step 512, the method 500 may include determining, based on the first ENUM query, whether a Session Initiation Protocol Uniform Resource Identifier (SIP URI) or other identifier is stored within a memory of the ENUM client. In one or more embodiments, the determination may be performed by utilizing the first carrier private ENUM 218. If a SIP URI is able to be retrieved, then the second device 122B that is intended to receive the IP call from the first device 122A may also be subscribed to the first carrier 150. If the second device 122B is subscribed to the first carrier, then the method 500 may include, at step 516, having the ENUM client perform a DNS lookup to resolve a domain name to an IP address. Based on the IP address, the method 500 may then include, at step 520, connecting and completing the call (e.g. IP-to-IP call) to the second device 122B within the first carrier communications network 150.

If, however, at step 512, the SIP URI or other identifier cannot be retrieved based on the first query, the ENUM client may be unable to resolve the domain to an appropriate IP address to complete the call. Based on the foregoing, the method 500 may include, at step 524, having the call request exit to the BGCF/TF 215 of the first carrier 150 and following process flow A. The process flow A that occurs once the call request exits to the BGCF/TF is illustrated in FIG. 5B.

Figure 6:
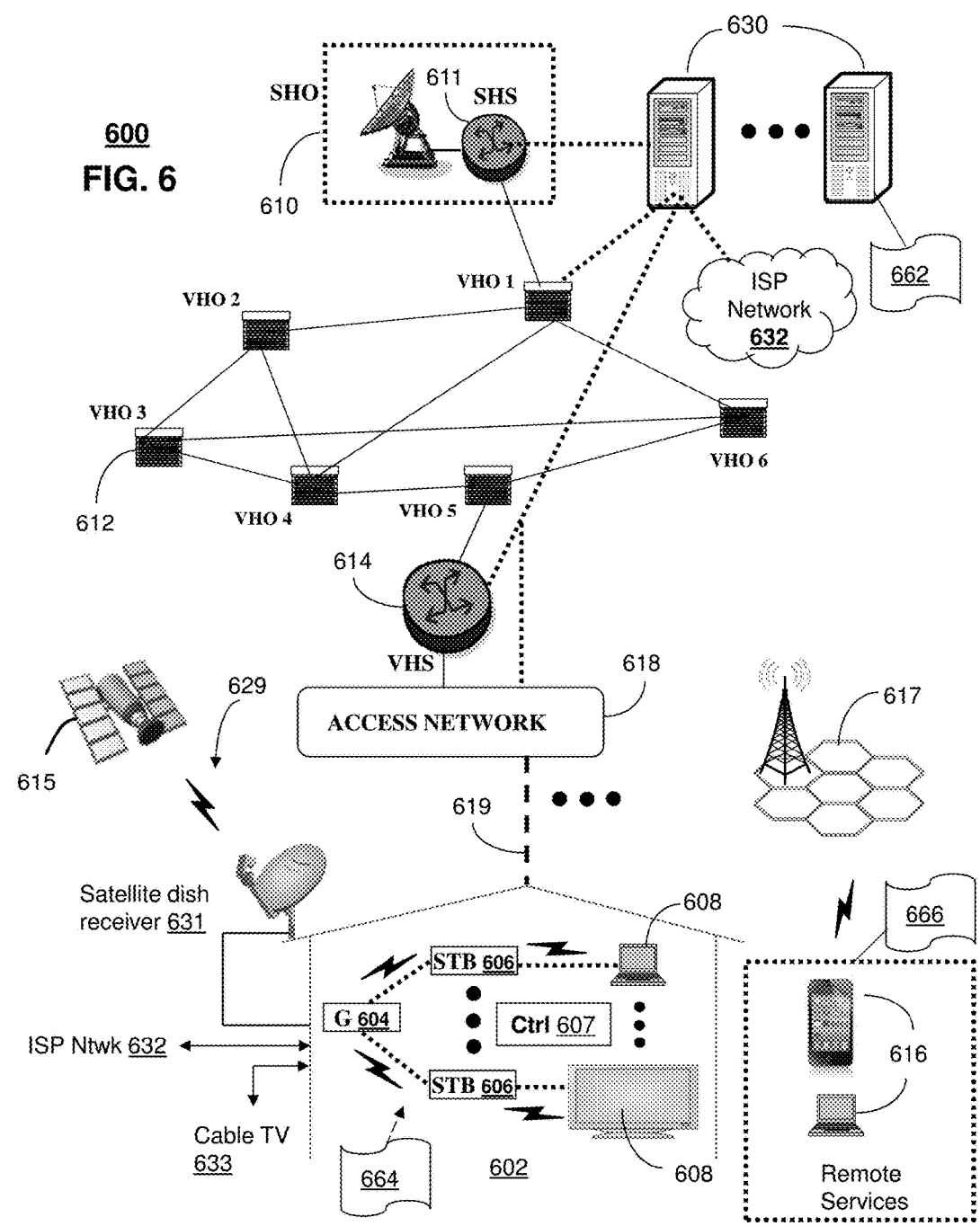
FIGS. 6-7 depict illustrative embodiments of communication systems that provide telecommunication and media services according to the system of FIGS. 1-3.

FIG. 6 illustrates additional steps for the method 500 for processing an IP-based call using a target architecture for enabling IP carrier peering. Once the call request exits to the BGCF/TF 215 of the first carrier 150, the method 500 may include, at step 550, having the BGCF/TF 215 convert the domain of the query to an inter-carrier ENUM apex domain, such as, but not limited to, "e164enum.net." At step 550, a modified query including the inter-carrier ENUM apex domain may be sent to ENUM cache 230 of the first carrier 150.

At step 554, the ENUM may check and examine the new incoming inter-carrier ENUM apex domain to determine which carrier the query should be sent to. In one or more embodiments, the checking and examining may be performed by utilizing the ENUM cache 230. At step 558, the method 500 may include determining whether the inter-carrier ENUM apex domain (e.g. "e164enum.net") has been found based on the querying. If the inter-carrier ENUM apex domain has been found based on the querying, the method 500 may include, at step 562, performing the Flows 3-12 shown in FIG. 2. If, however, the inter-carrier ENUM apex domain is not found based on the querying, then the call may not be an IP based call, and the call may be routed to a Public Switched Telephone Network (PSTN), a 2G network, a 3G network, another network, or any combination thereof, for delivery to the second subscriber at step 566 of the method 500.

FIG. 6 depicts an illustrative embodiment of a first communication system 600 for delivering media content. The communication system 600 can represent an Internet Protocol Television (IPTV) media system. Communication system 600 can be overlaid or operably coupled with system 100 of FIGS. 1-3, as another representative embodiment of communication system 600. For instance, one or more devices illustrated in the communication system 600 of FIG. 6 can perform receiving, at a first carrier, a first query for a record for a called number associated with a request to connect an internet protocol call between a first device of the first carrier and a second device of a second carrier, where the first query includes an inter-carrier telephone number mapping apex domain. An internetwork packet exchange telephone number mapping of a partner network can be queried for a pointer to a second telephone number mapping of the second carrier according to the first query and, in turn, the second telephone number mapping can be queried for the record of the called number using the pointer to the second telephone number mapping of the second carrier. The record can be forwarded from the second telephone number mapping to an internet protocol multimedia subsystem of the first carrier for routing the internet protocol call to the second carrier.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616. Communication system 600 can also provide for all or a portion of the computing devices 630 to function as an ENUM cache 630. The ENUM cache 630 can use computing and communication technology to perform function 662, which can include among other things, the techniques for enabling carrier peering for IP calls as described by methods 400 and 500 of FIGS. 4, 5A, and 5B. For instance, function 662 of server 630 can be similar to the functions described for the ENUM cache 230 of FIG. 2 in accordance with method 400. The media processors 606 and wireless communication devices 616 can be provisioned with software functions 664 and 666, respectively, to utilize the services of ENUM cache 630. For instance, functions 664 and 666 of media processors 606 and wireless communication devices 616 can be similar to the functions described for the communication devices 116 and 122A-D of FIGS. 1-2 in accordance with method 400.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
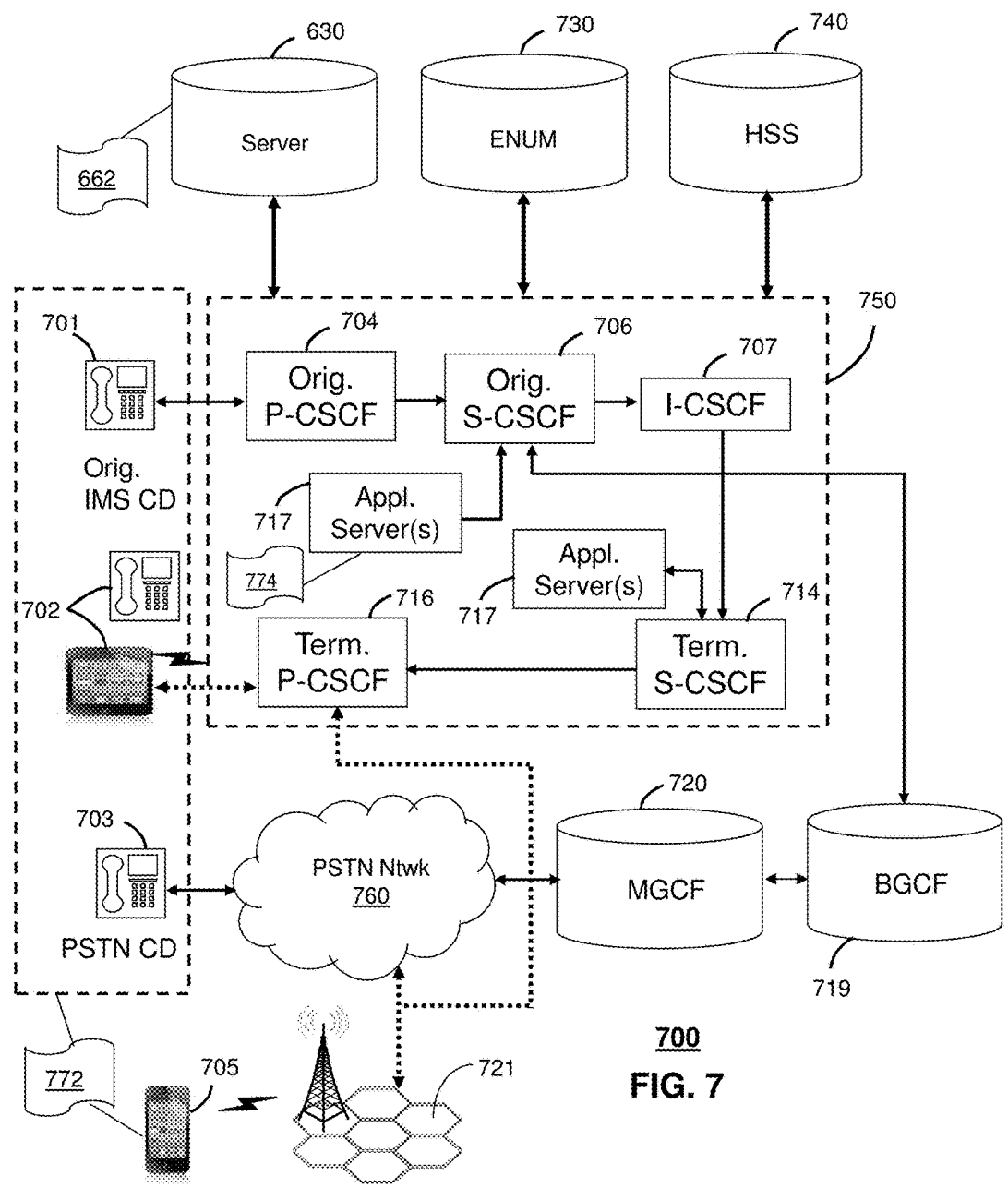

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with system 100 of FIGS. 1-3 and communication system 600 as another representative embodiment of communication system 600, for receiving, at a first carrier, a first query for a record for a called number associated with a request to connect an internet protocol call between a first device of the first carrier and a second device of a second carrier, where the first query includes an inter-carrier telephone number mapping apex domain. An internetwork packet exchange telephone number mapping of a partner network can be queried for a pointer to a second telephone number mapping of the second carrier according to the first query and, in turn, the second telephone number mapping can be queried for the record of the called number using the pointer to the second telephone number mapping of the second carrier. The record can be forwarded from the second telephone number mapping to an internet protocol multimedia subsystem of the first carrier for routing the internet protocol call to the second carrier.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The ENUM cache 630 of FIG. 6 can be operably coupled to communication system 700 for purposes similar to those described above. ENUM cache 630 can perform function 662 and thereby provide services to enable carrier peering for IP calls for the CDs 701, 702, 703 and 705 of FIG. 7, similar to the functions described for ENUM cache 230 of FIG. 2 in accordance with methods 400-500 of FIGS. 4, 5A, and 5B. CDs 701, 702, 703 and 705, which can be adapted with software to perform function 772 to utilize the services of the ENUM cache 630 similar to the functions described for communication devices 116 and 122A-D of FIGS. 1 and 2 in accordance with methods 400-500 of FIGS. 4, 5A, and 5B. ENUM cache 630 can be an integral part of the application server(s) 717 performing function 774, which can be substantially similar to function 662 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
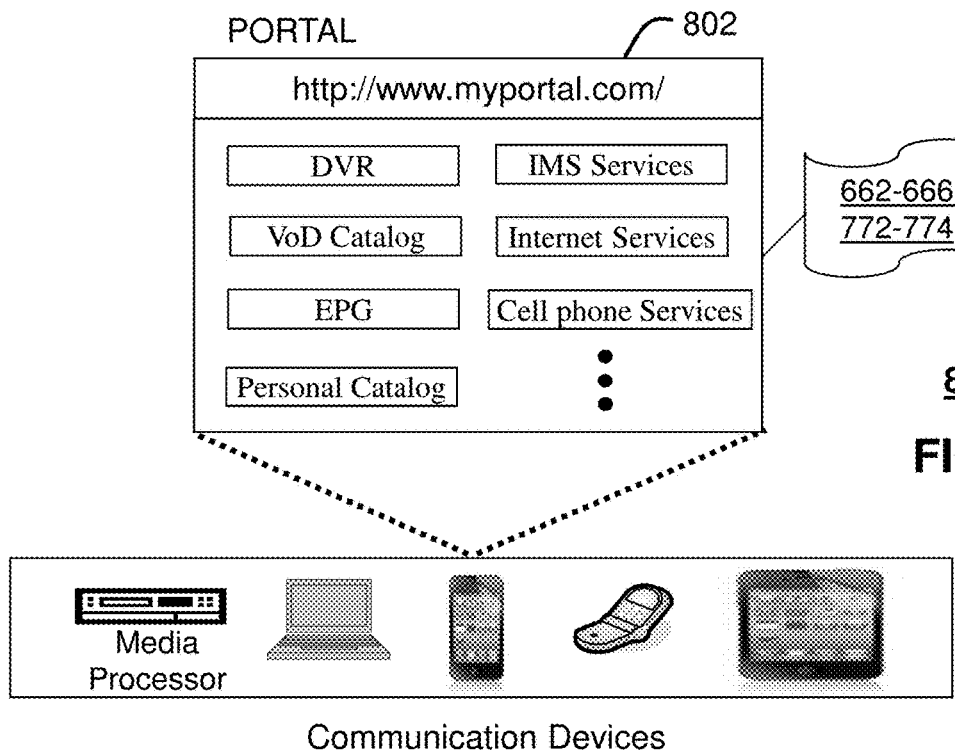
FIG. 8 depicts an illustrative embodiment of a web portal for interacting with the communication systems of FIGS. 1-3, and 6-7.

FIG. 8 depicts an illustrative embodiment of a web portal 802 of a communication system 800. Communication system 800 can be overlaid or operably coupled with system 100 of FIGS. 1-3, communication system 600, and/or communication system 700 as another representative embodiment of system 100 of FIGS. 1-3, communication system 600, and/or communication system 700. The web portal 802 can be used for managing services of system 100 of FIGS. 1-3 and communication systems 600-700. A web page of the web portal 802 can be accessed by a Uniform Resource Locator (URL) with an Internet browser using an Internet-capable communication device such as those described in FIGS. 1-3 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-666, and 772-774 to adapt these applications as may be desired by subscribers and/or service providers of system 100 of FIGS. 1-3, and communication systems 600-700. For instance, users of the services provided by ENUM cache 230 or server 630 can log into their on-line accounts and provision the server 630 with user profiles, provide contact information to server to enable it to communication with devices described in FIGS. 1-3, and so on. Service providers can log onto an administrator account to provision, monitor and/or maintain the system 100 of FIGS. 1-3, or server 630.

Figure 9:
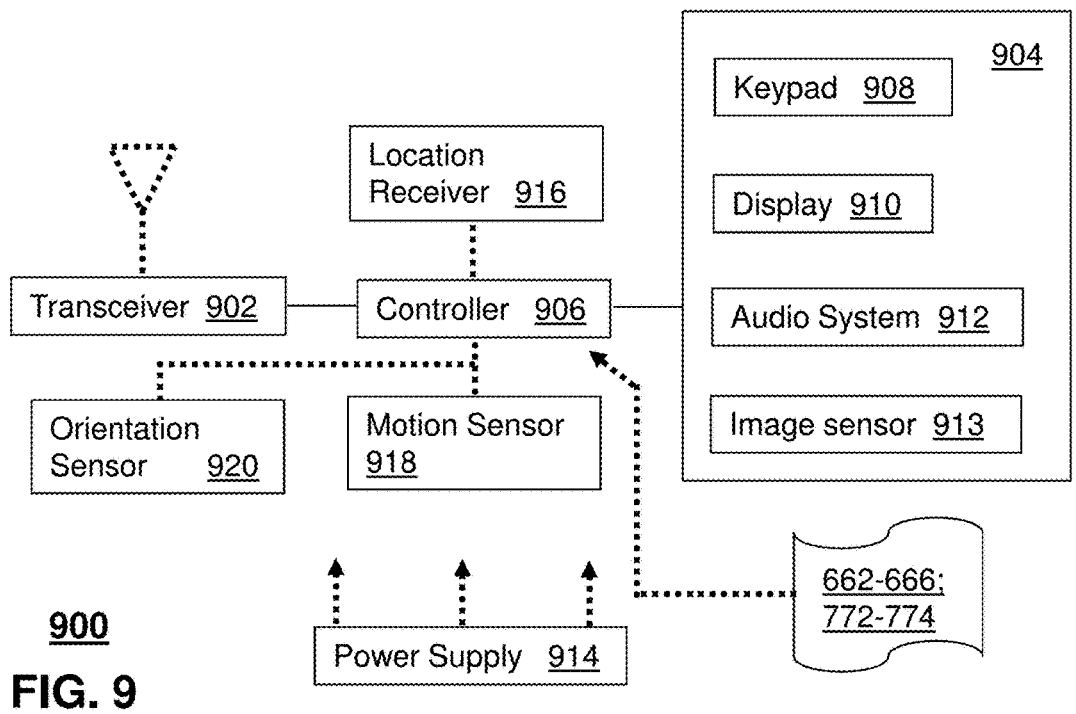
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-3 and FIGS. 6-7 and can be configured to perform portions of method 400-500 of FIGS. 4, 5A, and 5B.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1-3, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems of FIGS. 1-3, communication systems 600-700 of FIGS. 6-7 such as a gaming console and a media player. In addition, the controller 906 can be adapted in various embodiments to perform the functions 662-666 and 772-774, respectively.

Upon reviewing the aforementioned embodiments, it would be evident to an artisan with ordinary skill in the art that said embodiments can be modified, reduced, or enhanced without departing from the scope of the claims described below. For example, the ENUM cache 230 can search its cache or another cache of the first carrier network 150 for a stored copy of a NAPTR record of the called number of the second device 122C of the second carrier network 152 from a prior query by the ENUM cache 230 of the second carrier Tier 2 ENUM 234.

In another alternative embodiment, the steps of querying the IPX Tier ENUM 222 and the second carrier Tier 2 ENUM 234 can be omitted if the ENUM cache 230 of the first carrier network 150 finds a stored copy of a NAPRT record for the second device 122C. In another alternative embodiment, the ENUM cache can maintain the stored NAPRT record for the second device 122C for storage period (e.g., ten minutes) to provide an operating window of optimized performance, while ensuring that the information stored at the ENUM cache 230 is kept up to date. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
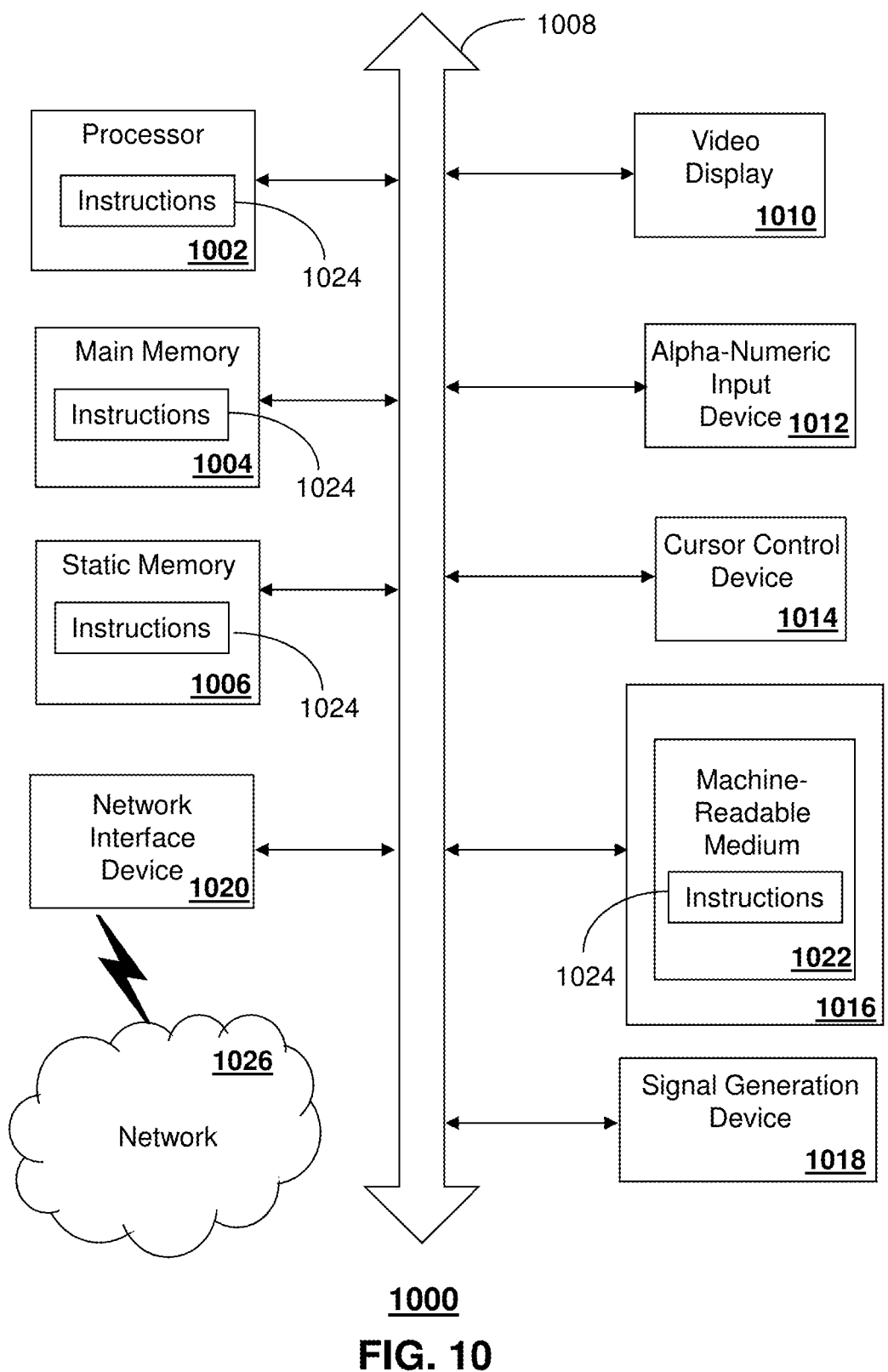
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the ENUM cache 630, the mobile communication device 116, the IP calling devices 122A-D, the IMS Core 214, and other devices of FIGS. 1-3. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments.

Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory that stores instructions;
   a processor that executes the instructions to perform operations, the operations comprising:
   receiving, from an internet protocol multimedia subsystem of a first carrier, a first query for a record of a called number, wherein the first query is associated with a request sent by a first device of the first carrier to initiate an internet protocol call with a second device of a second carrier, wherein the first query comprises a first carrier domain and the called number corresponding to the second device;
   querying, using the first query, a first telephone number mapping equipment of the first carrier;
   if the first query does not return a record including the called number, converting from the first carrier domain to an inter-carrier telephone number mapping apex domain to generate a second query;
   querying, using the second query, a cache telephone number mapping equipment of the first carrier;

if the second query does not return the record including the called number, querying, using the second query, an internetwork packet exchange telephone number mapping equipment of a partner network of the first carrier and the second carrier for a pointer to a second telephone number mapping equipment of the second carrier;

querying, according to the pointer, the second telephone number mapping equipment of the second carrier for the record of the called number;

receiving the record of the called number from the second telephone number mapping equipment of the second carrier; and returning the record to the internet protocol multimedia subsystem for routing the internet protocol call to the second carrier.

2. The device of claim 1, wherein the operations further comprise querying, using the pointer to the second telephone number mapping of the second carrier, a domain name server to obtain an internet protocol address for the second telephone number mapping equipment of the second carrier.

3. The device of claim 2, wherein the operations further comprise querying, using the second query, the cache telephone number mapping equipment of the first carrier for a stored copy of the pointer to the second telephone number mapping equipment of the second carrier obtained from a prior query of the internetwork packet exchange telephone number mapping equipment of the partner network, wherein the pointer that is used for the querying of the second telephone number mapping equipment of the second carrier is based on the stored copy if the stored copy is found in the cache.

4. The device of claim 3, wherein the step of querying the internetwork packet exchange telephone number mapping equipment of the partner network is not performed if the stored copy is found in the cache.

5. The device of claim 3, wherein the operations further comprise:

storing the pointer to the second telephone number mapping equipment of the second carrier that is obtained from the prior query of the internetwork packet exchange telephone number mapping equipment of the partner network at the cache of the first carrier as the stored copy; and removing the stored copy of the pointer from the cache of the first carrier if a storage time lapses.

6. The device of claim 1, wherein the internetwork packet exchange telephone number mapping equipment of the partner network queries a portability database at the partner network to obtain a service profile identifier for the second telephone number mapping equipment of the second carrier, and wherein the internetwork packet exchange telephone number mapping equipment of the partner network converts the service profile identifier into the pointer to the second telephone number mapping equipment of the second carrier.

7. The device of claim 1, wherein the cache of the first carrier is queried for a stored copy of the record of the called number obtained from the second telephone number mapping equipment.

8. The device of claim 7, wherein the steps of querying the internetwork packet exchange telephone number mapping equipment of the partner network and querying the second telephone number mapping equipment of the second carrier are not performed if the stored copy is found in the cache.

9. The device of claim 7, wherein the operations further comprise:

storing the record of the called number that is obtained from the second telephone number mapping equipment at the cache of the first carrier as the stored copy; and removing the stored copy of the called number from the cache of the first carrier if a storage time lapses.

10. The device of claim 1, wherein the pointer to the second telephone number mapping equipment of the second carrier that is received from the internetwork packet exchange telephone number mapping equipment of the partner network comprises one of an A record, an AAAA record, or a combination thereof.

11. The device of claim 1, wherein the internet protocol multimedia subsystem comprises a breakout gateway control function, a transit function, or a combination thereof.

12. The device of claim 1, wherein the internet protocol multimedia subsystem of the first carrier routes the internet protocol call to a second session border controller of the second carrier using a session initiation protocol uniform resource identifier that is included in the record.

13. A non-transitory machine-readable storage medium, comprising executable instructions that, when executed by a processor, facilitate performance of operations, comprising:

receiving, from a first device of a first carrier, a request to initiate an internet protocol call with a second device having a called number;

querying, using a first query including a first carrier domain, a first telephone number mapping equipment of the first carrier;

if the first query does not return a record including the called number corresponding to the second device, converting from the first carrier domain to an intercarrier telephone number mapping apex domain to generate a second query;

querying, using the second query, a cache telephone number mapping equipment of the first carrier for the record including the called number corresponding to the second device, wherein the second query is used by the cache telephone number mapping equipment of the first carrier to query an internetwork packet exchange telephone number mapping equipment of a partner network of the first carrier and a second carrier for a pointer to a second telephone number mapping equipment of the second carrier, and wherein the pointer to the second telephone number mapping equipment is used by the cache telephone number mapping equipment of the first carrier to query the second telephone number mapping equipment of the second carrier for the record of the called number;

receiving the record of the called number from the cache telephone number mapping equipment of the first carrier; and routing, based on the record, the internet protocol call to the second carrier.

14. The non-transitory machine-readable storage medium of claim 13, wherein the pointer to the second telephone number mapping equipment of the second carrier that is received from the internetwork packet exchange telephone number mapping equipment of the partner network comprises one of an A record, an AAAA record, or a combination thereof.

15. The non-transitory machine-readable storage medium of claim 13, wherein the internetwork packet exchange telephone number mapping equipment of the partner network performs a query of a portability database at the partner network to obtain a service profile identifier for the second telephone number mapping equipment of the second carrier, and wherein the internetwork packet exchange telephone number mapping equipment of the partner network converts the service profile identifier into the pointer to the second telephone number mapping equipment of the second carrier.

16. The non-transitory machine-readable storage medium of claim 13, wherein the pointer to the second telephone number mapping equipment of the second carrier is used by the cache telephone number mapping equipment of the first carrier to query a domain name server to obtain an internet protocol address for the second telephone number mapping equipment of the second carrier.

17. The non-transitory machine-readable storage medium of claim 13, wherein the cache telephone number mapping equipment of the first carrier searches for a stored copy of the pointer to the second telephone number mapping equipment of the second carrier obtained from a prior query of the internetwork packet exchange telephone number mapping equipment of the partner network, and wherein the pointer that is used for the querying of the second telephone number mapping equipment of the second carrier is based on the stored copy if the stored copy is found by the cache telephone number mapping equipment of the first carrier.

18. The non-transitory machine-readable storage medium of claim 17, wherein the querying of the internetwork packet exchange telephone number mapping equipment of the partner network is not performed if the stored copy is found by the cache telephone number mapping equipment of the first carrier.

19. A method, comprising:
  receiving, by a system comprising a processor at a first carrier, a first query for a record of a called number associated with a request to connect an internet protocol call between a first device of the first carrier and a second device of a second carrier, wherein the first query comprises an inter-carrier telephone number mapping apex domain, wherein the first query is generated from a second query by substituting the inter-carrier telephone number mapping apex domain for a first carrier domain upon a failure of the second query to return the record of the called number from a first telephone number mapping equipment of the first carrier;
  querying, by the system, an internetwork packet exchange telephone number mapping equipment of a partner network of the first carrier and the second carrier for a pointer to a second telephone number mapping equipment of the second carrier according to the first query;
  querying, by the system, the second telephone number mapping equipment of the second carrier for the record of the called number using the pointer to the second telephone number mapping equipment of the second carrier; and
  forwarding, by the system, the record from the second telephone number mapping equipment of the second carrier to an internet protocol multimedia subsystem of the first carrier for routing the internet protocol call to the second carrier.

20. The method of claim 19, further comprising querying, by the system, a cache at the first carrier, using the first query, for a stored copy of the pointer to the second telephone number mapping equipment of the second carrier obtained from a prior query of the internetwork packet exchange telephone number mapping equipment of the partner network, wherein the pointer that is used for the querying of the second telephone number mapping equipment of the second carrier is based on the stored copy if the stored copy is found in the cache.

* * * * *